(12) United States Patent
Chen et al.

(10) Patent No.: US 12,182,274 B2
(45) Date of Patent: Dec. 31, 2024

(54) TESTING ADVERSARIAL ROBUSTNESS OF SYSTEMS WITH LIMITED ACCESS

(71) Applicant: International Business Machines Corporation, Armonk, NY (US)

(72) Inventors: Pin-Yu Chen, Yorktown Heights, NY (US); Sijia Liu, Cambridge, MA (US); Lingfei Wu, Yorktown Heights, NY (US); Chia-Yu Chen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/382,107

(22) Filed: Oct. 20, 2023

(65) Prior Publication Data

US 2024/0045974 A1  Feb. 8, 2024

Related U.S. Application Data

(63) Continuation of application No. 16/256,107, filed on Jan. 24, 2019, now Pat. No. 11,836,256.

(51) Int. Cl.
*G06F 21/57* (2013.01)
*G06N 3/04* (2023.01)
(Continued)

(52) U.S. Cl.
CPC ............ *G06F 21/577* (2013.01); *G06N 3/04* (2013.01); *G06N 3/08* (2013.01); *G06V 10/764* (2022.01);
(Continued)

(58) Field of Classification Search
CPC ............ G06F 11/3688; G06F 11/3684; G06F 21/577; G06F 11/3664; G06F 16/27; G06F 11/3692; G06F 30/27; G06F 21/566; G06F 18/214; G06F 21/54; G06F 21/52; G06F 2221/033; G06F 11/3672; G06F 30/20; H04L 9/50; H04L 67/02; H04L 63/1416;
(Continued)

(56) References Cited

U.S. PATENT DOCUMENTS

| | | | |
|---|---|---|---|
| 7,587,598 B2 * | 9/2009 | Ohba | H04L 63/08 713/169 |
| 7,917,758 B2 * | 3/2011 | Palekar | H04L 63/08 709/227 |

(Continued)

FOREIGN PATENT DOCUMENTS

| | | |
|---|---|---|
| CN | 109272455 A | 1/2019 |
| CN | 111476264 A | 7/2020 |

(Continued)

OTHER PUBLICATIONS

Appendix P—List of IBM Patents or Patent Applications Treated as Related, Filed herewith, 2 Pages.

(Continued)

*Primary Examiner* — Sharif E Ullah
(74) *Attorney, Agent, or Firm* — L. Jeffrey Kelly

(57) ABSTRACT

An adversarial robustness testing method, system, and computer program product include testing, via an accelerator, a robustness of a black-box system under different access settings, where the testing includes tearing down the robustness testing to a subtask of a predetermined size.

21 Claims, 13 Drawing Sheets

(51) Int. Cl.
  *G06N 3/08* (2023.01)
  *G06V 10/764* (2022.01)
  *G06V 10/82* (2022.01)

(52) U.S. Cl.
  CPC ........ G06V 10/82 (2022.01); *G06F 2221/034* (2013.01)

(58) Field of Classification Search
  CPC ............... H04L 9/3239; H04L 67/1097; H04L 2209/56; H04L 43/50; H04L 63/168; H04L 63/1466; H04L 67/34; H04L 63/20; H04L 67/01; H04L 43/55; H04W 84/042; H04W 48/16; H04W 24/06; H04W 12/065; H04W 12/33
  USPC .......... 726/2, 21, 25, 36; 713/150, 163, 181; 380/255, 264, 276
  See application file for complete search history.

(56) References Cited

U.S. PATENT DOCUMENTS

| | | | |
|---|---|---|---|
| 7,954,161 B1 | 5/2011 | Guruswamy et al. | |
| 8,457,919 B2* | 6/2013 | Feix | G06F 21/556 713/168 |
| 8,590,018 B2* | 11/2013 | Thavasi | G06F 21/31 726/28 |
| 8,843,738 B2* | 9/2014 | Vos | H04L 69/22 709/224 |
| 9,026,784 B2* | 5/2015 | Buruganahalli | H04L 63/20 713/176 |
| 9,608,963 B2* | 3/2017 | Lu | H04L 67/14 |
| 10,009,183 B2* | 6/2018 | Pahl | G06F 21/33 |
| 10,670,890 B2* | 6/2020 | Graff | H04R 5/02 |
| 11,669,687 B1* | 6/2023 | Joshi | G06F 40/30 704/9 |
| 2008/0098207 A1* | 4/2008 | Reid | G06F 11/3636 714/E11.207 |
| 2008/0098208 A1 | 4/2008 | Reid et al. | |
| 2010/0161821 A1* | 6/2010 | Slamkovic | H04L 67/565 709/230 |
| 2017/0187529 A1* | 6/2017 | Guilley | H04L 9/14 |
| 2017/0268001 A1* | 9/2017 | Khodarev | A61K 31/713 |
| 2018/0005136 A1 | 1/2018 | Gai et al. | |
| 2018/0247195 A1* | 8/2018 | Kumar | G16B 40/10 |
| 2018/0268222 A1* | 9/2018 | Sohn | G06V 40/172 |
| 2018/0307188 A1* | 10/2018 | Mummadi | G06N 3/045 |
| 2018/0308012 A1* | 10/2018 | Mummadi | G06N 3/08 |
| 2018/0349324 A1* | 12/2018 | Krappé | G06Q 30/0283 |
| 2019/0065956 A1* | 2/2019 | Qian | G06N 3/082 |
| 2019/0188562 A1* | 6/2019 | Edwards | G06N 5/045 |
| 2019/0370440 A1* | 12/2019 | Gu | G06N 3/048 |
| 2020/0073788 A1* | 3/2020 | Saha | G06F 11/3688 |
| 2020/0097853 A1* | 3/2020 | Golovin | G06N 5/01 |
| 2020/0111018 A1* | 4/2020 | Golovin | G06F 11/3006 |
| 2020/0167691 A1* | 5/2020 | Golovin | G06N 7/01 |
| 2020/0234110 A1* | 7/2020 | Singh | G06N 3/04 |
| 2020/0242250 A1* | 7/2020 | Chen | G06V 10/82 |
| 2021/0304009 A1* | 9/2021 | Bazarsky | G06N 3/06 |
| 2022/0004818 A1* | 1/2022 | Koopman | G06V 10/98 |
| 2022/0012572 A1* | 1/2022 | Chen | G06N 3/045 |
| 2022/0043978 A1* | 2/2022 | Wang | G06N 5/04 |
| 2022/0044283 A1* | 2/2022 | Briancon | G06F 18/2155 |
| 2022/0046057 A1* | 2/2022 | Kutt | G06N 3/08 |
| 2022/0279014 A1* | 9/2022 | Stokes, III | G06F 21/56 |

FOREIGN PATENT DOCUMENTS

| | | | | |
|---|---|---|---|---|
| WO | WO-2017164820 A1 * | 9/2017 | ......... | G06F 21/6218 |
| WO | WO2018/222205 A1 | 6/2018 | | |
| WO | WO 2018/231708 A2 | 12/2018 | | |

OTHER PUBLICATIONS

Mel, et al. "The NIST Definition of Cloud Computing". Recommendations of the National Institute of Standards and Technology. Nov. 16, 2015.

Petra Vidnerová and Roman Neruda, "Evolutionary generation of adversarial examples for deep and shallow machine learning models," Proceedings of the 3rd Multidisciplinary International Social Networks Conference on SocialInformatics 2016, Data Science 2016 (MISNC, SI, DS 2016). ACM, New York, NY, USA, Article 43, 7 pages.

Z. Khorshidpour, S. Hashemi and A. Hamzeh, "Learning a Secure Classifier against Evasion Attack," 2016 IEEE 16th International Conference on Data Mining Workshops (ICDMW), Barcelona, 2016, pp. 295-302.

Fabio Carrara, Fabrizio Falchi, Roberto Caldelli, Giuseppe Amato, Roberta Fumarola, and Rady Becarelli, "Detecting adversarial example attacks to deep neural networks," Proceedings of the 15th International Workshop on Content-Based Multimedia Indexing (CBMI '17). ACM, New York, NY, USA, Article 38, 7 pages.

Daniel Zügner, Amir Akbarnejad, and Stephan Günnemann, "Adversarial Attacks on Neural Networks for Graph Data," Proceedings of the 24th ACM SIGKDD International Conference on Knowledge Discovery & Data Mining (KDD '18). ACM, New York, NY, USA, 2847-2856.

Pin-Yu Chen, et al. "ZOO: Zeroth Order Optimization based Black-box Attacks to Deep Neural Networks" arXiv:708.03999v2 [stat. ML] Nov. 2, 2017. ACM. New York, USA.

Chinese Office Action dated Apr. 27, 2023, in corresponding Chinese Patent Application No. 202010055649.9.

Chinese Office Action dated Sep. 27, 2023, in corresponding Chinese Patent Application No. 202010055649.9.

United States Office Action dated Feb. 15, 2022, in U.S. Appl. No. 16/256,107.

United States Office Action dated Jun. 7, 2022, in U.S. Appl. No. 16/256,107.

United States Office Action dated Oct. 5, 2022, in U.S. Appl. No. 16/256,107.

United States Office Action dated Dec. 20, 2022, in U.S. Appl. No. 16/256,107.

United States Office Action dated Mar. 29, 2023, in U.S. Appl. No. 16/256,107.

United States Office Action dated Jul. 18, 2023, in U.S. Appl. No. 16/256,107.

United States Office Notice of Allowance dated Sep. 1, 2023, in U.S. Appl. No. 16/256,107.

Brendel, W., et al. (2018). Decision-Based Adversarial Attacks: Reliable Attacks Against Black-Box Machine Learning Models. arXiv [Stat. ML]. Retrieved from http://arxiv.org/abs/1712.04248.

Cheng, M., et al. (2018). Query-Efficient Hard-label Black-box Attack:An Optimization-based Approach. arXiv [Cs.LG]. Retrieved from http://arxiv.org/abs/1807.04457.

Chinese Office Action dated Apr. 27, 2023, in corresponding Chinese Patent Application No. 202010055649.9 [Translated].

Chinese Office Action dated Sep. 27, 2023, in corresponding Chinese Patent Application No. 202010055649.9. [Translated].

Chun-Chen, Tu., et al. 2019. AutoZOOM: autoencoder-based zeroth order optimization method for attacking black-box neural networks. In Proceedings of the Thirty-Third AAAI Conference on Artificial Intelligence and Thirty-First Innovative Applications of Artificial Intelligence Conference and Ninth AAAI Symposium on Educational Advances in Artificial Intelligence (AAAI'19/IAAI'19/EAAI'19). AAAI Press, Article 92, 742-749. https://doi.org/10.1609/aaai.v33i01.3301742.

Ilyas, A., et al. (2018). Query-Efficient Black-box Adversarial Examples (superceded). arXiv [Cs.CV]. Retrieved from http://arxiv.org/abs/1712.07113.

Liu, S., et al. (2018). Zeroth-Order Stochastic Variance Reduction for Nonconvex Optimization. arXiv [Cs.LG]. Retrieved from http://arxiv.org/abs/1805.10367.

Liu, Y. et al. (2016). Delving into Transferable Adversarial Examples and Black-box Attacks. ArXiv, abs/1611.02770. Published in International Conference on Learning Representations Nov. 4, 2016 Computer Science.

(56) References Cited

OTHER PUBLICATIONS

Papernot, N. et al. 2017. Practical Black-Box Attacks against Machine Learning. In Proceedings of the 2017 ACM on Asia Conference on Computer and Communications Security (Asia CCS '17). Association for Computing Machinery, New York, NY, USA, 506-519. https://doi.org/10.1145/3052973.3053009.

Zhao, P., et al. (2019). On the Design of Black-box Adversarial Examples by Leveraging Gradient-free Optimization and Operator Splitting Method. arXiv [Cs.CV]. Retrieved from http://arxiv.org/abs/1907.11684.

* cited by examiner

FIG. 3

Performance evaluation of adversarial attacks on MNIST and CIFAR-10.

| Data set | Attack method | ASR | $\ell_1$ distortion | $\ell_2$ distortion | $\ell_\infty$ distortion | Query count on initial success | Reduction ratio on query count |
|---|---|---|---|---|---|---|---|
| MNIST | C&W white-box attack | 100% | 22.14 | 1.962 | 0.3194 | - | - |
| | Transfer attack (via C&W) | 30.6% | 65.2 | 4.545 | 0.803 | - | - |
| | ZOO attack | 98.8% | 26.78 | 1.977 | 0.522 | 12161 | 0.0% |
| | ZO-ADMM score-based attack | 98.3% | 26.23 | 1.975 | 0.513 | 493.6 | 95.9% |
| | ZO-ADMM decision-based attack | 100 % | 30.48 | 2.166 | 0.548 | 7603 $^a$ | 37.48% |
| CIFAR-10 | C&W white-box attack | 100 % | 11.7 | 0.332 | 0.0349 | - | - |
| | Transfer attack (via C&W) | 8.5% | 103.6 | 3.845 | 0.421 | - | - |
| | ZOO attack | 97.6 % | 15.2 | 0.361 | 0.0405 | 9982 | 0.0% |
| | ZO-ADMM score-based attack | 98.7% | 13.1 | 0.354 | 0.0392 | 249.3 | 97.5% |
| | ZO-ADMM decision-based attack | 100% | 17.25 | 0.415 | 0.0413 | 6213 $^a$ | 37.76% |

FIG. 6

Performance evaluation of adversarial attacks on ImageNet.

| | Attack method | Untargeted attack | | | | Targeted attack | | |
|---|---|---|---|---|---|---|---|---|
| | | ASR | Final $\ell_2$ | Query count on initial success | Reduction ratio | ASR | Query count on initial success | Reduction ratio |
| score-based | C&W white-box attack | 100% | 0.455 | - | - | 99% | - | - |
| | ZOO attack | 98% | 1.217 | 15631 | 0.0% | 78% | $2.11 \times 10^6$ | 0.0% |
| | Query limited | 100% | 4.62 | 4785 | 69.4% | 98% | 34128 | 98.4% |
| | ZO-ADMM score-based attack | 100% | 1.064 | 572 | 96.3% | 97% | 16058 | 99.2% |
| decision-based | Label only | -[a] | - | - | - | 92% | $1.89 \times 10^6$ [a] | 10.4% |
| | ZO-ADMM decision-based attack | 100% | 3.58 | 11742 [b] | 24.9% | 94% | $1.52 \times 10^6$ [a] | 28% |

FIG. 10

Performance evaluation of the ZO-ADMM-based attacks on MNIST for different $\ell_p$ norms.

| Attack method | ASR | $\ell_0$ | $\ell_1$ | $\ell_2$ | $\ell_\infty$ |
|---|---|---|---|---|---|
| ZO-ADMM $\ell_0$ | 100% | 18.5 | 12.6 | 9.72 | 0.989 |
| ZO-ADMM $\ell_1$ | 100% | 465 | 10.5 | 2.71 | 0.978 |
| ZO-ADMM $\ell_2$ | 100% | 483 | 22.09 | 1.93 | 0.521 |

TESTING ADVERSARIAL ROBUSTNESS OF SYSTEMS WITH LIMITED ACCESS

CROSS-REFERENCE TO RELATED APPLICATIONS

The present application is a Continuation Application of U.S. patent application Ser. No. 16/256,107, filed on Jan. 24, 2019, the entire contents of which are hereby incorporated by reference.

BACKGROUND

The present invention relates generally to an adversarial robustness testing method, and more particularly, but not by way of limitation, to a system, method, and computer program product for an acceleration module (i.e., an accelerator) that reliably speeds up robustness testing of black-box artificial intelligence (AI) and machine-learning (ML) models under different access settings.

Black-box attacks on machine learning (ML) systems is the study of adversarial examples and algorithms that generate them and include how to analyze how state-of-the-art ML systems behave in extreme situations (e.g., when an authentic image is intentionally corrupted by imperceptible noises to deceive a well-trained image classifier into misclassification). This is currently one of the most prominent topics in AI and could potentially help to shape a future of advanced AI platforms that not only perform well in average cases, but also in worst cases or adverse situations.

In recent years, deep neural networks (DNNs) have achieved significant breakthroughs in many machine learning tasks such as natural language processing (NLP), computer vision, speech processing, etc. However, despite success, there have been many recent studies showing that even the state-of-the-art DNNs are still vulnerable to adversarial misclassification attacks. This raises security concerns about a robustness of DNNs in extreme situations, which are very important in many application domains that require high reliability and dependability such as face recognition, autonomous driving vehicles, and malware detection. Investigating adversarial examples and potential attacks that generate them has become an increasingly prevailing topic in AI security and safety, which aims to analyze how modern ML systems (such as DNNs) could be broken in extreme situations. Such an analysis would shed light on potential defensive measures to be incorporated, which essentially lay the groundwork to building a new generation of highly robust and reliable ML models that will be the core engine of future AI technology.

However, most of the preliminary studies on this topic are still restricted to a white-box setting where the adversary has complete access and knowledge of a target system (e.g., DNNs) and the operating mechanism. For instance, assuming knowledge of a DNN model's internal structure and parameters, the adversary can compute a gradient of an output with respect to an input to identify an effect of perturbing the values of certain input components on a predicted output. Consequently, this can be used to construct an adversarial example that would likely be misclassified by the target model. Despite the theoretical interest, such approaches often have very limited use in practical black-box systems where internal states/configurations and operating mechanism of public ML systems are not revealed to the practitioners and the only mode of interaction with the system is via submitting inputs and receiving the corresponding predicted outputs.

One conventional approach to exploring black-box attacks is to use gradient estimation via zeroth-order optimization ('ZOO'). This conventional approach makes queries to a model and estimates the output gradients with respect to the corresponding inputs. Then, the approach applies a 'Carlini and Wagner (C&W) attack method' to generate adversarial examples. However, this conventional technique is very computationally intensive because it requires a large number of queries per iteration to generate an accurate gradient estimation.

Alternatively, a different conventional technique is aimed to estimate an output gradient via a greedy local search. At each iteration, the conventional technique perturbs only a subset of the input component. This local search technique is very computationally efficient, but the technique does not explicitly minimize the distortion between the original input and its perturbed version. Also, the crafted noises often appear more visible. Moreover, the technique has not been tested on data-intensive domains such as ImageNet.

Another conventional technique investigates more realistic threat models by defining the query-limited setting, the partial information setting, and the label-only setting. Three attacks methods are proposed based on the Natural Evolutionary Strategies and Monte Carlo approximation. But, this technique only places limits on the $L_\infty$ norm instead of minimizing a certain $L_p$ m norm.

SUMMARY

Thus, the inventors have identified a need in the art for an adversarial attack in the application of image (i.e., an input) classification with deep neural networks (DNNs).

In an exemplary embodiment, the present invention provides a computer-implemented adversarial robustness testing method for checking a learning performance of a black-box system, the method including testing a robustness of a black-box system under different access settings via an accelerator.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 3 exemplarily depicts an experimental result as compared to conventional techniques;

FIGS. 6-8 exemplarily depict experimental results as compared to conventional techniques;

FIG. 10 exemplarily depicts an experimental result as compared to conventional techniques;

DETAILED DESCRIPTION

Figure 1:
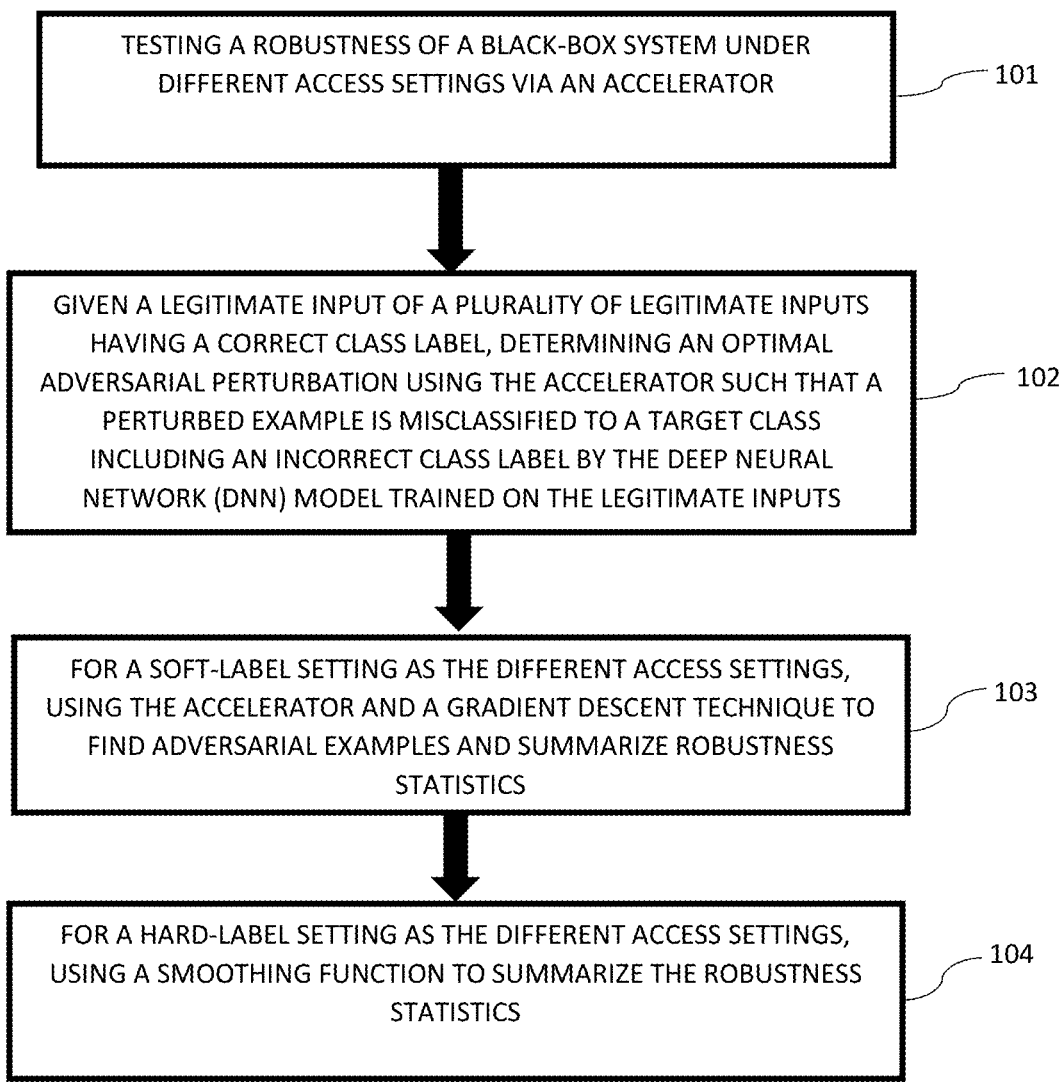
FIG. 1 exemplarily shows a high-level flow chart for an adversarial robustness testing method 100 according to an embodiment of the present invention.

The invention will now be described with reference to FIGS. 1-13, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of an adversarial robustness testing method 100 according to the present invention can include various steps for an adversarial robustness testing system for checking a learning performance of black-box artificial intelligence (AI) and machine-learning (ML) systems. The invention is distinct from robustness testing of software/module bugs and inherent security vulnerability because this invention is used to generate adversarial inputs (data input manipulation). Robustness evaluation is neither bug nor security testing—it associates with the model's confidence in prediction given an input.

Figure 11:
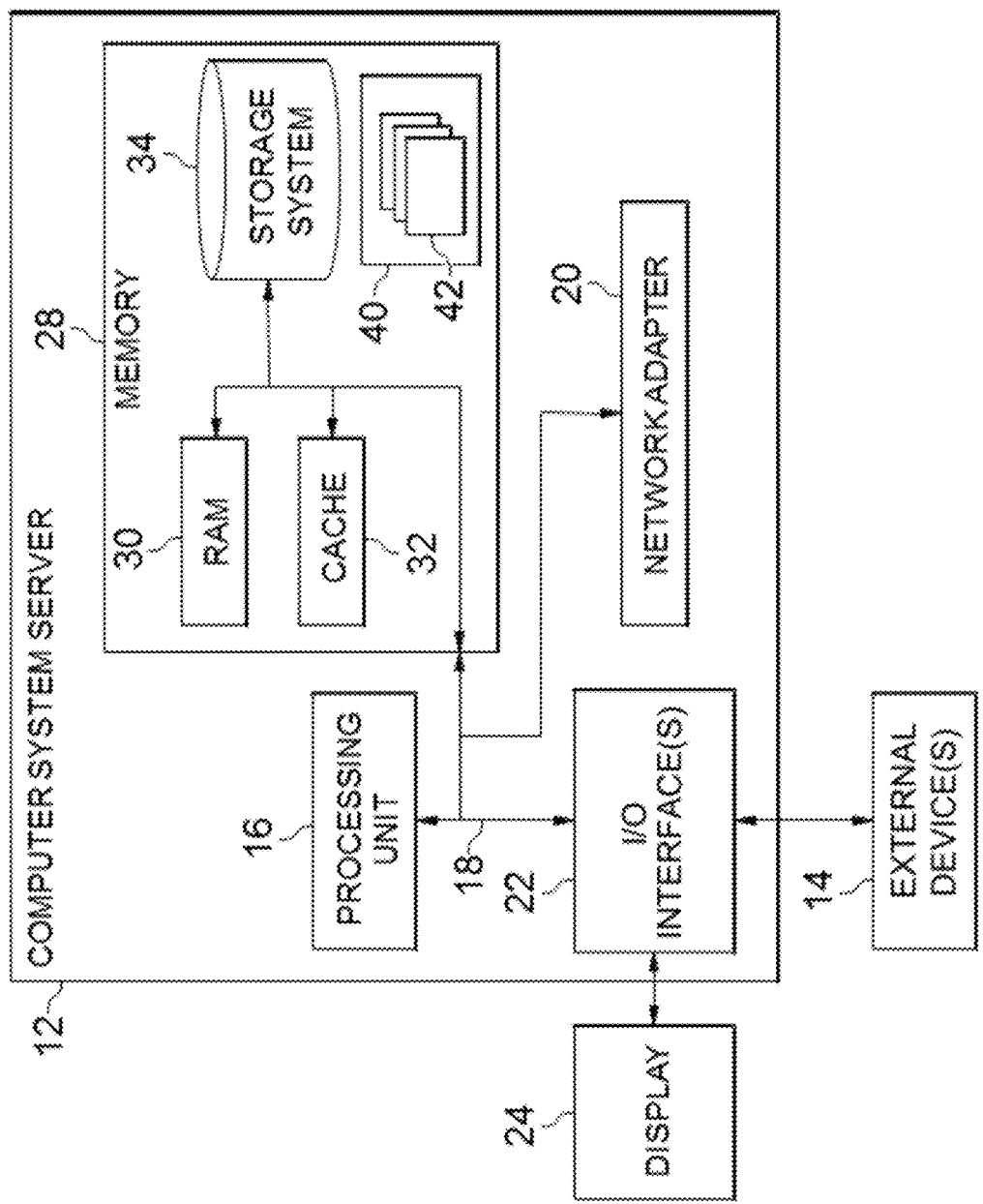
FIG. 11 depicts a cloud-computing node 10 according to an embodiment of the present invention.

By way of introduction of the example depicted in FIG. 11, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 13), it is nonetheless understood that the present invention can be implemented outside of the cloud environment.

With reference to FIG. 1, in step 101, a robustness of a black-box system is tested under different access settings via an accelerator. The accelerator has the following functions of 'efficient gradient estimation via random directional estimates and averaging' (i.e, $\hat{g}(x) = b/q \Sigma2\_(i=1)\hat{}q(f(x+\varepsilon u\_i) - f(x))/\varepsilon u\_i, u\_i$~unit-norm sphere; zeroth-order stochastic variance reduction for nonconvex optimization), 'dimension reduction' (i.e., reducing the attack space for query efficiency (e.g., image resizing, data-driven decoder: $x\_adv = x\_orig + D(\delta\_low)$  $D: \mathbb{R}\hat{}(d\_low) \to \mathbb{R}\hat{}(d\_orig))$, a decoder such as AutoZOOM: Autoencoder-based zeroth order optimization method for attacking black-box neural networks)), and problem splitting that can tear down the robustness testing optimization process (i.e., attack objective under a threat model) to small and efficient-to-solve subtasks by ⟦ Minimize⟧ _x f(x)+h(x)≡⟦ Minimize⟧ _(x,z) f(x)+h(z) s.t. x=z using a general black-box adversarial attack framework via zeroth-order ADMM).

A black-box system is one that only allows access to system inputs and outputs, but not model internals or details.

A white-box system is a model that details such as architecture and weights for inference are completely known to an adversary.

The different access settings include a 'soft-label setting' and a 'hard-label setting'. A soft-label setting may be system outputs prediction scores of each class, whereas a hard-label setting may be system only outputs top-1 prediction label (no scores, neither other classes).

In other words, the invention receives a first classification of an input as an output from the black-box system and determines a minimal change to the input such that a second classification (i.e., different from the first classification) is received as the output from the black-box system. Indeed, the invention finds a minimal change to an input such that a classification of an output from the black-box system is different than an original classification of the input.

In step 102, given a legitimate input of a plurality of legitimate inputs having a correct class label, an optimal adversarial perturbation is determined using the accelerator such that a perturbed example is misclassified to a target class including an incorrect class label by the deep neural network (DNN) model trained on the legitimate inputs.

In step 103, for a soft-label setting (i.e., outputs prediction scores of all classes) as the different access settings, the accelerator and a gradient descent technique is used to find adversarial examples and summarize robustness statistics.

In step 104, for a hard-label setting (i.e., only outputs the most probable (top-1) class label) as the different access settings, a smoothing function is used to summarize the robustness statistics.

Figure 2:
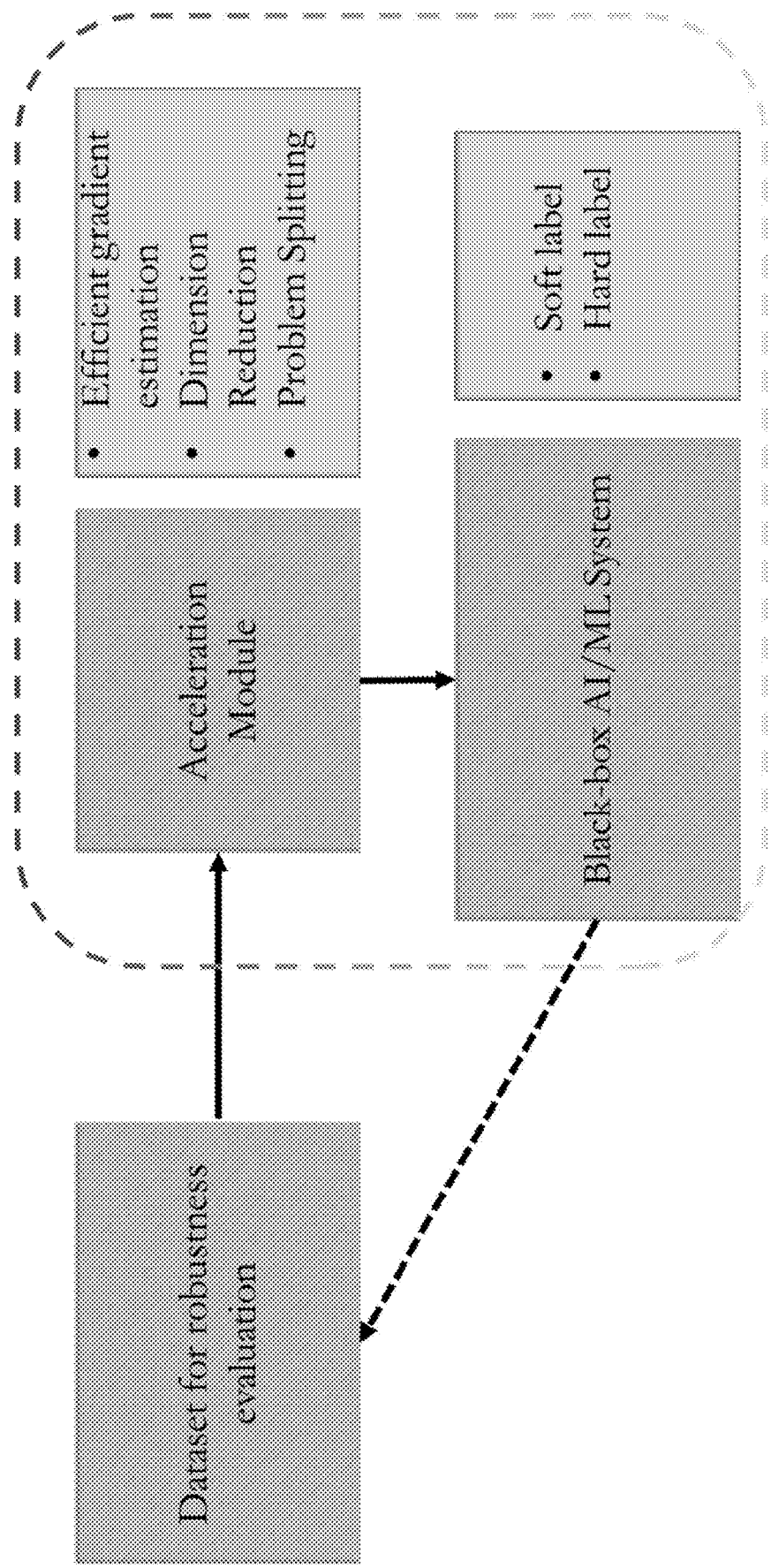
FIG. 2 exemplarily depicts a framework for testing a robustness of a black-box system according to an embodiment of the present invention.

With reference to FIG. 2, there are no limitations on the input dataset for robustness testing. The invention can support any data format that is a valid input to the AI/ML system. That is, the robustness objective is user-specified or uses system defined "threat models" for adversarial examples (E.g., |x_adv−x_orig|_p≤s). Examples of inputs into the invention include images, text (or embeddings), audio waveforms, table data, etc.

With reference generally to FIGS. 1-10, the invention operates with adversarial attacks in the application of an input (i.e., image or the like) classification with deep neural networks (DNNs). To do so, a general problem formulation for adversarial attack is presented which is amenable to either white-box or black-box settings. Then, an efficient solution is developed to the black-box setting where the adversary only has access to certain types of outputs of the DNN model (i.e., internal structures and configurations are unknown to the adversary). In particular, given a legitimate image $x_0 \in \mathbb{R}^d$ with a correct class label to, the invention aims to design an optimal adversarial perturbation $\delta \in \mathbb{R}^d$ so that the perturbed example $(x_0 + \delta)$ is misclassified to target class t≠t0 by the DNN model trained on legitimate images. A well-designed perturbation δ can be obtained by solving the following problem of equation (1):

$$\underset{\delta}{\text{minimize}} \quad f(x_0 + \delta, t) + \gamma D(\delta) \quad (1)$$

$$\text{subject to} \quad (x_0 + \delta) \in [0, 1]^d, \|\delta\|_\infty \le \epsilon,$$

where f(x, t) denotes the loss incurred by misclassifying $(x_0+\delta)$ to target class t and D(δ) is a distortion function that controls perceptual similarity between a legitimate image and an adversarial example (i.e., $D(\delta)=\|\delta\|_2^2 \cdot \|\cdot\|_\infty$ signifies the $L_\infty$ norm.

In equation (1), the 'hard' constraints (i.e., hard-label settings) ensure that the perturbed noise δ at each pixel is imperceptible up to a predefined E-tolerant threshold and the non-negative regularization parameter γ places emphasis on the distortion between an adversarial example and a legitimate image. Furthermore, in the above equation (1), $D^{\wedge}(\delta)=\|\delta\|_2^2$, which is motivated by the superior performance of the C&W $L_2$ adversarial attack.

It is noted that a choice of a loss function f(x, t) can be varied in the invention. That is, without loss of generality, the invention focuses on targeted attack with a designated target class t (i.e., a second classification) to mislead the DNN (i.e., from the first classification of the original input) since the untargeted attack version can be implemented based on that of the targeted attack. It is emphasized that in the black-box setting, the gradients of f(x, t) cannot be obtained directly as it does in the white-box setting. The form of the loss function f(x, t) depends on the constrained information in different black-box feedback settings. In particular, the definition of score-based approach and a decision-based attacks as well as their loss functions are discussed as follows.

In the score-based attack setting, the adversaries are able to make queries to the DNN to obtain the soft labels (i.e., scores or probabilities of an image belonging to different classes), while information on gradients are not available. The loss function of equation (1) in the score-based attack is equation (2):

$$f(x_0 + \delta, t) = \max\left\{\max_{j \ne t}\{\log P(x_0 + \delta)_j\} - \log P(x_0 + \delta)_t, -\kappa\right\}, \quad (2)$$

Equation (2) yields the good performance among existing white-box attacks. $P(x)_j^{denotes}$ the target model's prediction score or probability of the j-th class, and κ is a confidence parameter, which is usually set to zero. Basically, this implies $f(x_0+\delta, t)=0$ if $P(x_0+\delta)_t$ is the largest among all classes, which means the perturbation δ has successfully made the target model misclassified $x_0+\delta$ to target class t. Otherwise, it will be larger than zero. It is noted that in equation (2) the log probability log P(x) is used instead of directly using the actual probability P(x) because the output probability distribution tends to have the probability of one particular class dominating the others, which makes the query on the probability/score less effective. This explains why the log operator is used to reduce the effect of the dominating class while still preserving the probability order for all classes.

For untargeted adversarial attack, the classification of the adversarial example $x_0+\delta$ should be different from its correct class $t_0$. The loss function takes the following form of equation (3):

$$f(x_0 + \delta) = \max\left\{\log P(x_0 + \delta)_{t_0} - \max_{j \ne t_0}\{\log P(x_0 + \delta)_j\}, -\kappa\right\}. \quad (3)$$

Basically, equation (3) achieves its minimum value when $P(x_0+\delta)_{t_0}$ is not the largest among all classes, which implies a successful untargeted attack.

Different from the score-based attack, the decision-based attack is more challenging in that the adversaries can only make queries to get the hard-labels instead of the soft-labels $P(x)_j$. Let $H(x)_i$ denote the hard-label decision of the input image x for class i. $H(x)_i=1$ if the decision for x is label i, and 0 otherwise. Also, i=1 $H(x)_i=1$ for all K classes. Then the loss function of equation (1) in the decision-based attack is specified as equation (4) as follows:

$$f(x_0 + \delta, t) = \max_{j \ne t} H(x_0 + \delta)_j - H(x_0 + \delta)_t, \quad (4)$$

Therefore, $f(x_0+\delta, t) \in \{-1, 1\}$, and the attacker succeeds if $f(x_0+\delta, t)=-1$. The loss function of equation (4) is non-smooth with discrete outputs. The decision-based attack is therefore more challenging because existing combinatorial optimization methods are almost ineffective or inapplicable considering the high dimensionality of the problem.

Thereby, the invention builds on the above identified problem for equations (1)-(4) to identify a minimal change of an input to not have the same classification by a DNN. The invention includes a general black-box adversarial attack framework for both the score-based and decision-based attacks by leveraging an inventive technique (i.e., 'ZO-ADMM'). The invention, via the below, yields benefits such as an efficient splitting between the black-box loss function and the white-box adversarial distortion function and a generalization to various $L_p$ norm involved hard/soft constraints. By introducing an auxiliary variable z, equation (1) can be rewritten in the favor of ADMM-type methods as equations (5)-(8) as follows:

$$\underset{\delta, z}{\text{minimize}} \quad f(x_0 + \delta, t) + \gamma D(z) + \mathcal{I}(z) \quad (5)$$

$$\text{subject to} \quad z = \delta$$

where $\mathcal{I}(z)$ is the indicator function given by (6)

$$\mathcal{I}(z) = \begin{cases} 0 & (x_0 + z) \in [0, 1]^d, \|z\|_\infty \le \epsilon, \\ \infty & \text{otherwise.} \end{cases}$$

The augmented Largrangian of the reformulated problem (5) is given by $$\mathcal{L}(z, \delta, u) = \gamma D(z) + \mathcal{I}(z) + f(x_0 + \delta, t) + u^T(z - \delta) + \frac{\rho}{2}\|z - \delta\|_2^2, \quad (7)$$

where u is Lagrangian multiplier, and ρ > 0 is a given penalty parameter.

It can be further transformed as below, $$\mathcal{L}(z, \delta, u) = \gamma D(z) + \mathcal{I}(z) + f(x_0 + \delta, t) + \frac{\rho}{2}\left\|z - \delta + \frac{1}{\rho}u\right\|_2^2 - \frac{1}{2\rho}\|u\|_2^2. \quad (8)$$

Similar to the standard ADMM algorithm, the inventive 'ZO-ADMM' splits optimization variables into two blocks and adopts the following iterative scheme of equations (9)-(11):

$$z^{k+1} = \arg\min_z \mathcal{L}(z, \delta^k, u^k), \quad (9)$$

$$\delta^{k+1} = \arg\min_\delta \mathcal{L}(z^{k+1}, \delta, u^k), \quad (10)$$

$$u^{k+1} = u^k + \rho(z^{k+1} - \delta^{k+1}), \quad (11)$$

where k denotes the iteration index. In equation (9), the invention minimizes L(z, δ, u) over z given parameters $\delta^k$ and $u^k$. In equation (10), the invention minimizes L(z, δ, u) over δ given $z^{k+1}$ from the previous step and $u^k$. Then, the Lagrangian multiplier u is updated in equation (11). The major advantage of this ADMM-type algorithm is that it allows the invention to split the original complex problem into sub-problems, each of which can be solved more efficiently or even analytically. In what follows, equations (9) and (10) are solved, respectively.

For z-step, equation (9) can be rewritten as:

$$\underset{z}{\text{minimize}} \; D(z) + \frac{\rho}{2\gamma}\|z-a\|_2^2 \quad (12)$$

subject to $(x_0 + z) \in [0, 1]^d$, $\|z\|_\infty \le \epsilon$, where $a = \delta^k - (1/\rho)u^k$. (13)

Equation (12) can be decomposed elementwise as below, $$\underset{z_i}{\text{minimize}} \; \left(z_i - \frac{\rho}{2\gamma+\rho}a_i\right)^2$$

subject to $([x_0]_i + z_i) \in [0, 1]$, $|z_i| \le \epsilon$, where $[x]_i$ (or $x_i$) denotes the i-th element of x.

The solution to equation (13) is then given by $$[z^{k+1}]_i = \begin{cases} \min\{1-[x_0]_i, \epsilon\} & \frac{\rho}{2\gamma+\rho}a_i > \min\{1-[x_0]_i, \epsilon\} \\ \max\{-[x_0]_i, -\epsilon\} & \frac{\rho}{2\gamma+\rho}a_i < \max\{-[x_0]_i, -\epsilon\} \\ \frac{\rho}{2\gamma+\rho}a_i & \text{otherwise.} \end{cases} \quad (14)$$

To generalize to various Lp norms, in equation (12), the invention sets $D(z) = \|z\|_2^2$ where the L2 norm is used to measure the similarity between the legitimate image and the adversarial example. If D(z) takes other $L_p$ norms such as $\|z\|_0$, $\|z\|_1$ or even $L_p$ norm combinations like $$\|z\|_1 + \frac{\beta}{2}\|z\|_2^2,$$

the invention is still able to obtain the solutions with minor modifications in the z-step. This ability is highly non-trivial for other black-box attacks, which are often heavily customized to minimize a specific $L_p$ norm for distortion measure.

In the experiments discussed later, although the proposed 'ZO-ADMM approach' can minimize different $L_p$ norms for the distortion, the invention mainly considers the case of $D(z) = \|z\|_2^2$ for a fair comparison with other white-box and black-box algorithms. But, it is highlighted that the 'ZO-ADMM method' is able to optimize various $L_p$ m norms, not only the $L_2$ norm.

For the δ-step, equation (10) can be written as:

$$\underset{\delta}{\text{minimize}} \; f(x_0 + \delta, t) + \frac{\rho}{2}\|\delta - b\|_2^2, \quad (15)$$

where $b = z^{k+1} + (1/\rho)u^k$. In the white-box setting, since the gradients of $f(x_0+\delta, t)$ are directly accessible, gradient descent method like stochastic gradient descent (SGD) can be applied straight-forwardly to solve equation (15). However, in black-box settings, the gradients of $f(x_0+\delta, t)$ are unavailable. Thus, to overcome this difficulty, the invention adopts the random gradient estimation method, which is detailed below.

That is, for the random gradient estimation, in the black-box setting, the gradient of $f(x_0+\delta, t)$ is estimated using a random gradient estimator of equation (16):

$$(\hat{\nabla}f(\delta)) = (d/\nu Q)\sum_{j=1}^{Q}[f(\delta + \nu u_j) - f(\delta)]u_j, \quad (16)$$

where d is the number of optimization variables, ν>0 is a smoothing parameter, $\{u_j\}$ denotes independent and identically distributed (i.i.d.) random direction vectors drawn from a uniform distribution over a unit sphere, and Q is the number of random direction vectors. A large Q reduces the gradient estimation error and improves the convergence of 'ZO-ADMM'. However, it is found that a moderate size of Q is sufficient to provide a good trade-off between estimation error and query complexity. The invention sets Q=20 in the experiments. It is also highlighted that the random gradient estimation in equation (16) only requires O(Q) query complexity instead of O(dQ) caused by coordinate-wise gradient estimation.

With the random gradient estimation, the solution to equation (15) can be obtained via stochastic gradient descent methods like SGD. However, it usually takes thousands of steps in the gradient descent process and at each step, multiple queries are required for accurate gradient estimation. The huge amount of queries will make the black-box attack computationally intensive.

To sidestep this computational bottleneck, it is noted that 'ZO-ADMIM' enjoys dual advantages of gradient-free operation and linearization of the loss function. By linearization, the loss function $f(x_0+\delta, t)$ in equation (15) is replaced with its first-order Taylor expansion plus a regularization term (known as Bregman divergence) (i.e., $\hat{\nabla}f(\delta^k+x_0,t))^T(\delta-\delta^k)+\tfrac{1}{2}\|\delta-\delta^k\|_G^2$), where G is a pre-defined positive definite matrix, and $\|x\|_G^2 = x^T G x$.

$G = \eta_k I$ where $1/\eta_k < 0$ is chosen as a decaying parameter (i.e., $\eta_k = \alpha\sqrt{k}$ for a given constant is α>0). The Bregman divergence term is used to stabilize the convergence of δ. Combining linearization and ZO gradient estimation, equation (15) takes the following form of equation (17)

$$\underset{\delta}{\text{minimize}} \; \frac{(\hat{\nabla}f(\delta^k+x_0,t))^T(\delta-\delta^k) +}{\frac{\eta_k}{2}\|\delta-\delta^k\|_2^2 + \frac{\rho}{2}\|\delta-b\|_2^2}, \quad (17)$$

And, equation (17) yields a quadratic programming problem with the following closed-form solution of equation (18):

$$\delta^{k+1} = (1/(\eta_k+\rho))(\eta_k\delta^k + \rho b + \hat{\nabla}f(\delta^k+x_0,t)). \quad (18)$$

It is noted that equation (18) can be calculated with only one step of gradient estimation, which is a significant improvement on the query efficiency compared with solving equation (15) using gradient descent method with thousands of random estimations.

For the score-based black-box attack, equation (1) with loss function of equation (2) can be naturally solved through the general 'ZO-ADMM-based framework'. In the decision-based black-box attack, the form of the loss function of equation (4) is non-smooth with discrete outputs. To overcome the discontinuity in equation (4), a smoothing version of equation (4), denoted by $f_\mu$ with smoothing parameter $\mu>0$ is taken into consideration as in equation (19):

$$f_\mu(x_0+\delta,t)=\mathbb{E}_{e \in U_b}[f(x_0+\delta+\mu u,t)], \quad (19)$$

where $U_b$ is a uniform distribution within the unit Euclidean ball, or u can follow a standard Gaussian distribution. The rational behind the smoothing technique in equation (19) is that the convolution of two functions (i.e., $f_\mu f(x_0+\delta+\mu u,t)p(u)du$, is at least as smooth as the smoothest of the two original functions. Therefore, when p is the density of a random variable with respect to Lebesgue measure, the loss function in equation (19) is then smooth. In practice, an empirical Monte Carlo approximation of (19) is considered as shown in equation (20):

$$f_\mu(x_0+\delta, t) \approx \frac{1}{N}\sum_{i=1}^{N} f(x_0+\delta+\mu u_i, t), \quad (20)$$

where $\{u_i\}$ are N i.i.d. samples drawn from $U_b$. With the smoothed loss function as in equation (20), equation (1) can be solved by the inventive general 'ZO-ADMM-based framework'. To initialize the 'ZO-ADMM', the invention initializes the perturbation $\delta$ so that the initial perturbed image belong to the target class, yielding a benefit of reducing query complexity compared to the initialization with an arbitrary image.

Performance Evaluation and Experimental Results

In this section, the experimental results of the score-based and decision-based black-box attacks are demonstrated. The experiments compare the invention 'ZO-ADMM-based framework' with a transfer attack technique and the ZOO attack technique on three image classification datasets, MNIST, CIFAR-10, and ImageNet. The results of state-of-the-art white-box attack (i.e., C&W attack) are also provided for reference.

The experiments are run by training two networks for MNIST and CIFAR-10 datasets, respectively, which can achieve 99.5% accuracy on MNIST and 80% accuracy on CIFAR-10. The model architecture has four convolutional layers, two max pooling layers, two fully connected layers and a softmax layer. For ImageNet, the experiments utilize a pre-trained Inception v3 network instead of training our a new model, which can achieve 96% top-5 accuracy. All experiments are conducted on machines with NVIDIA GTX 1080 TI GPUs.

In the evaluation on MNIST and CIFAR-10, 100 correctly classified images are selected from MNIST and CIFAR-10 test datasets, respectively. For each image, the target labels are set to the other 9 classes and a total of 900 attacks are performed for each attack method.

The implementations of C&W (white-box) attack and ZOO (black-box) attack are based on the GitHub code released by the authors. For the ZOO attack, the experiments use ZOO-ADAM with default Adam parameters and set $\lambda_{ini}=10$. For the transfer attack, the C&W attack is applied to the surrogate model with $\kappa=20$ to improve the attack transferability and 2,000 iterations in each binary search step. In the inventive 'ZO-ADMM-based attack', the sampling number in random gradient estimation as defined in equation (16), Q, is set to 20 and the sampling number for the decision-based smoothed loss function of (20), N, is set to 10. Further, the experiments set $\rho=1$ and $\gamma=1$ for MNIST, $\rho=10000$ and $\gamma=10$ for CIFAR-10, and $\rho=1000$ and $\gamma=1$ for ImageNet. $\varepsilon$ is set to 1 for three datasets. $v$ is set to 1 for MNIST, 0.1 for CIFAR-10, and 0.01 for ImageNet. The experiments set $\mu=0.1$ for three datasets.

The experimental results are shown in FIG. 3. Besides the attack success rate (ASR) and the $L_p$ m norms, the experiments report the query number on initial success due to the observation that the 'ZO-ADMM' score-based attack converges fast after the first successful attack is achieved. The experiments also show that the transfer attack suffers from low attack success rate (ASR) and large $L_2$ distortion. Both the 'ZOO attack' and the inventive 'ZO-ADMM attack' can achieve high attack success rate and competitive $L_2$ distortion close to the C&W white-box attack. Compared with the 'ZOO attack' (i.e., 12161), the 'ZO-ADMM score-based attack' (i.e., 493.6) requires far fewer queries to obtain the first successful adversarial example. The query count on the first successful attack in 'ZO-ADMM attack' is reduced by 95.9% and 97.5% on MNIST and CIFAR-10, respectively. The reduction of query number on first successful attack is achieved by a linearization technique in 'ZO-ADMM', which only requires one step of gradient estimation to solve the approximation problem instead of thousands of steps to solve the original problem.

Figure 4:
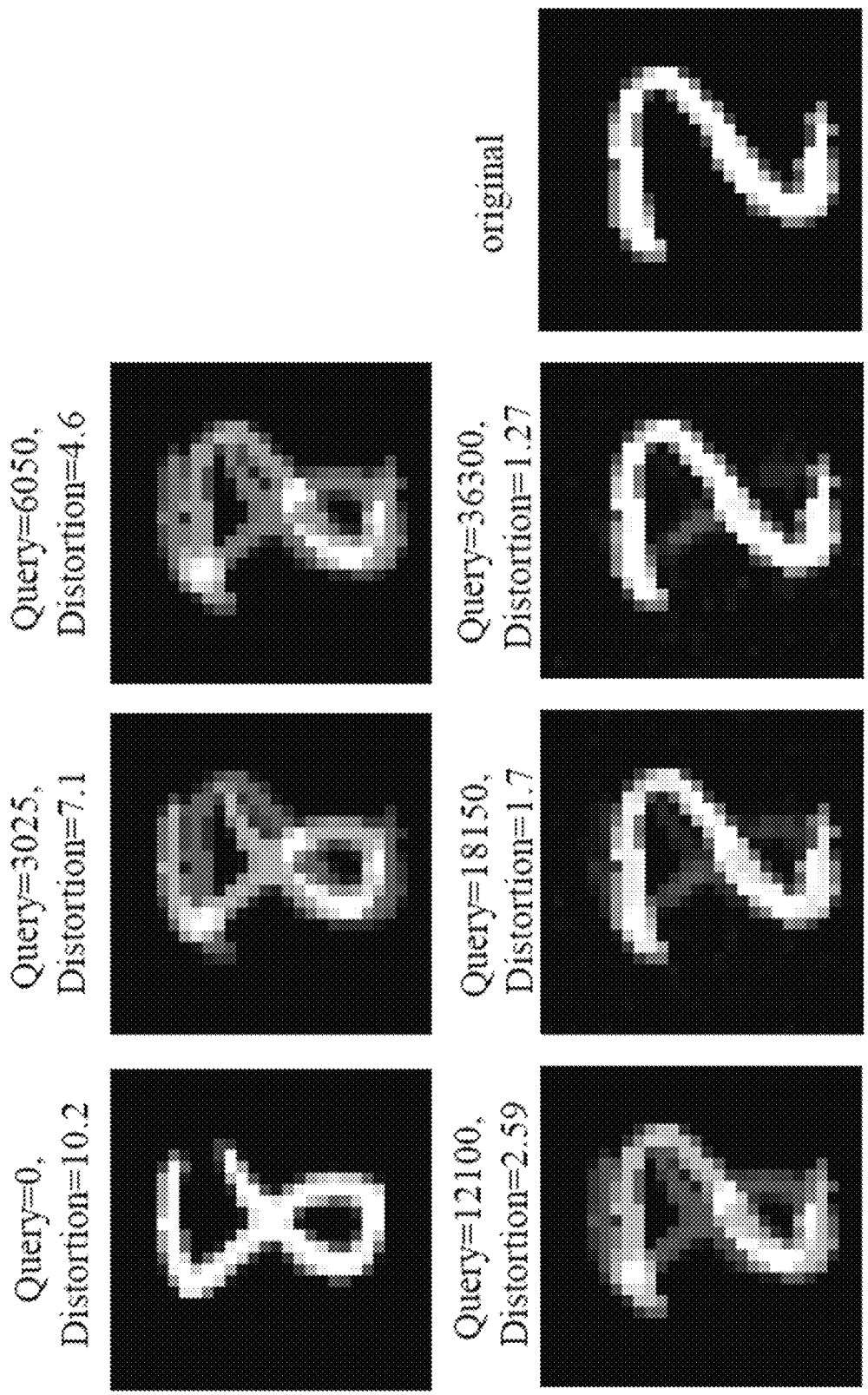
FIG. 4 exemplarily depicts an adversarial example evolution for MNIST starting from an image in a target class when a Query=0 according to an embodiment of the present invention.
Figure 5:
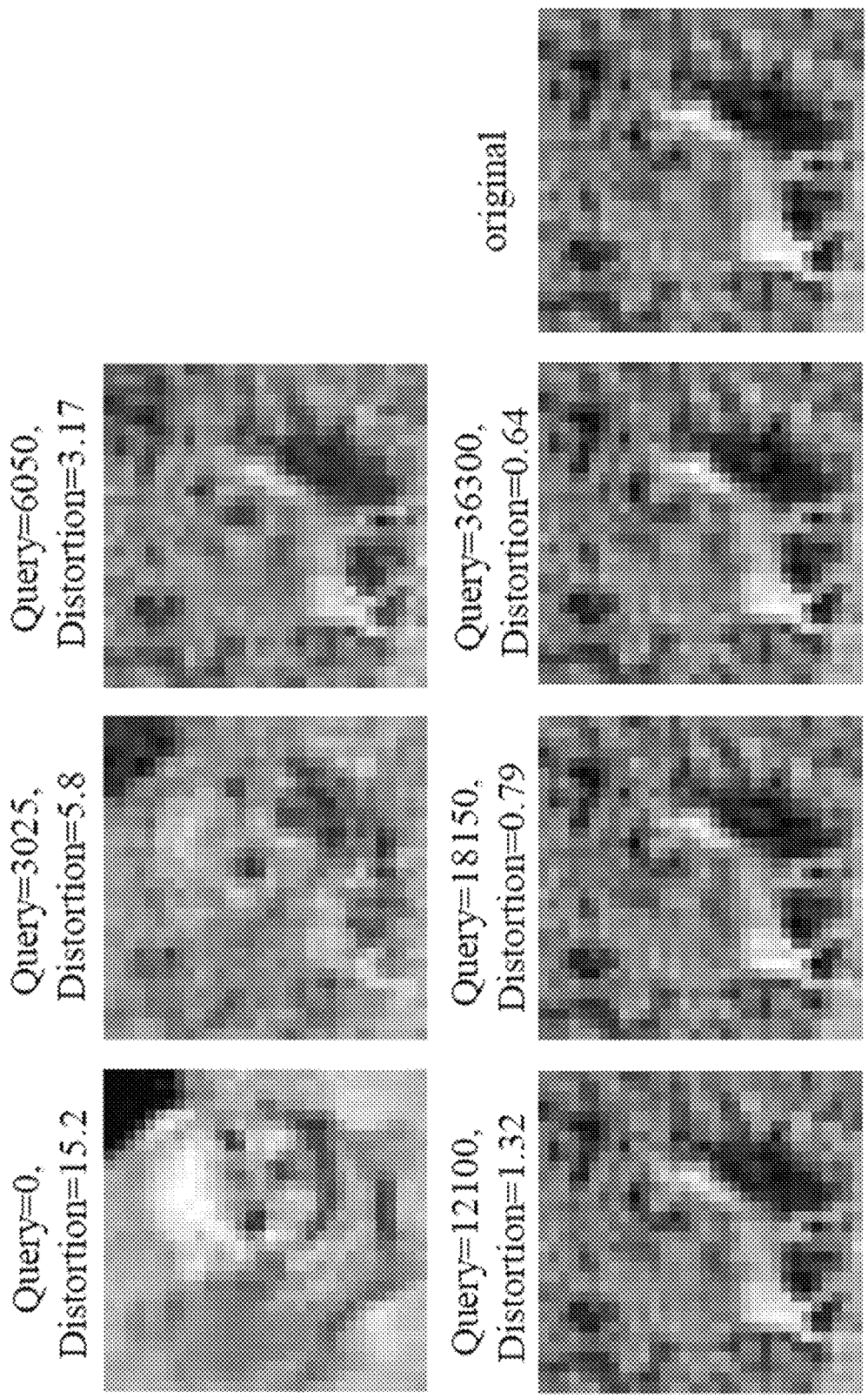
FIG. 5 exemplarily depicts an adversarial example evolution for CIFAR-10 starting from the image in the target class when a Query=0 according to an embodiment of the present invention.

The experiments also show that the 'ZO-ADMM decision-based attack' achieves an $L_2$ distortion slightly larger than the score-based attack with more queries. This is reasonable since only the hard label outputs are available in the decision-based attack, which is more challenging than the score-based setting. But, it is noted that the 'ZO-ADMM decision-based attack' requires fewer queries to achieve the same $L_2$ distortion of initial success with the 'ZOO attack'. Although the $L_2$ is a bit larger, the experiments show that the perturbations are still visually indistinguishable as demonstrated in FIGS. 4-5. FIGS. 4-5 further show the evolution of several adversarial examples in the decision-based attack versus the query number. The decision-based attack starts from an image in the target class. Then it tries to decrease the $L_2$ norm while keeping the classified label unchanged. After about 20,000 queries, the adversarial example is close to the original image with a small $L_2$ distance.

For evaluation on ImageNet, the experiments include performing targeted and untargeted attacks in the score-based and decision-based settings on ImageNet. 50 correctly classified images are randomly selected. For each image in targeted attack, 9 random labels out of 1000 classes are selected to serve as the targets. The experiments do not perform the transfer attack since it does not scale well to ImageNet due to training of the surrogate model. Instead, the experiments provide the results of new baselines on ImageNet, the query-limited and label-only attacks. The query-limited attack is a score-based attack. The label-only attack is a decision-based attack. The experiments follow the default parameter setting for the query limited and label only attacks. The invention provides for finding minimal changes to an input such that an output would not be classified the same as the input.

Figure 9:
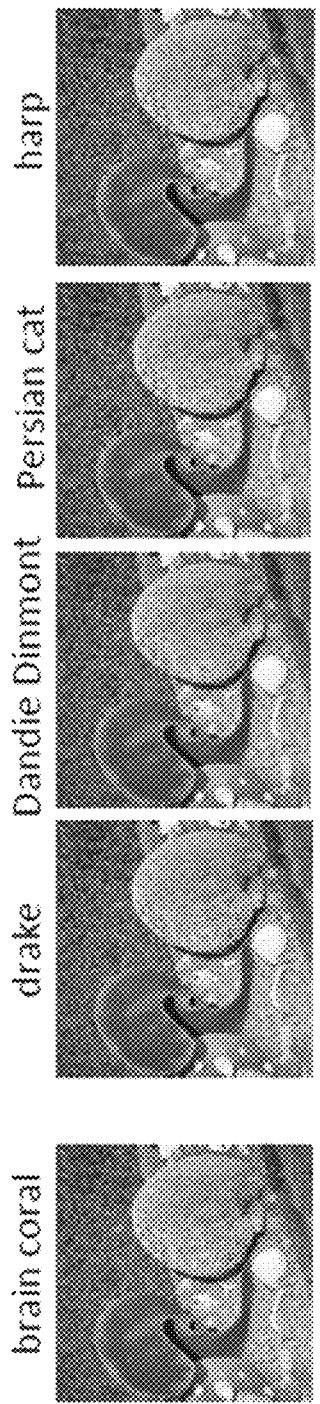
FIG. 9 exemplarily depict adversarial examples on ImageNet generated by the method 100 according to an embodiment of the present invention.

The experimental results are summarized in FIG. 6. For the score-based attacks, it is observed that the 'ZOO attack' is not able to keep high attack success rate (within a large but fixed query budget). The 'query-limited attack' can attain a high attack success rate and achieve initial success with fewer queries. But, as it only uses constraints on the $L_\infty$ norm without minimizing $L_2$ norm, relatively large $L_2$ norm can be observed as shown in FIG. 6. It is shown in FIG. 6 that the 'ZO-ADMM score-based attack' can achieve a high success rate with fewer queries than the 'ZOO attack' or the 'query-limited attack'. Also, the inventive technique reduces the query number on initial success by 96.3% and 99.2% for untargeted and targeted attacks, respectively, compared with the 'ZOO attack'. Although the final $L_2$ norms of black-box attacks are in general larger than the white-box C&W attack, the perturbations are still visually imperceptible. For decision-based attacks, the 'ZO-ADM:NI-based attack' can obtain a high success rate with fewer queries compared with the label-only attack or even the 'ZOO attack'. FIG. 9 shows the adversarial examples generated by the 'ZO-ADMM decision-based attack'. The classification of the image 'brain coral' is changed to 4 different target classes after adding imperceptible perturbations.

Figure 7:
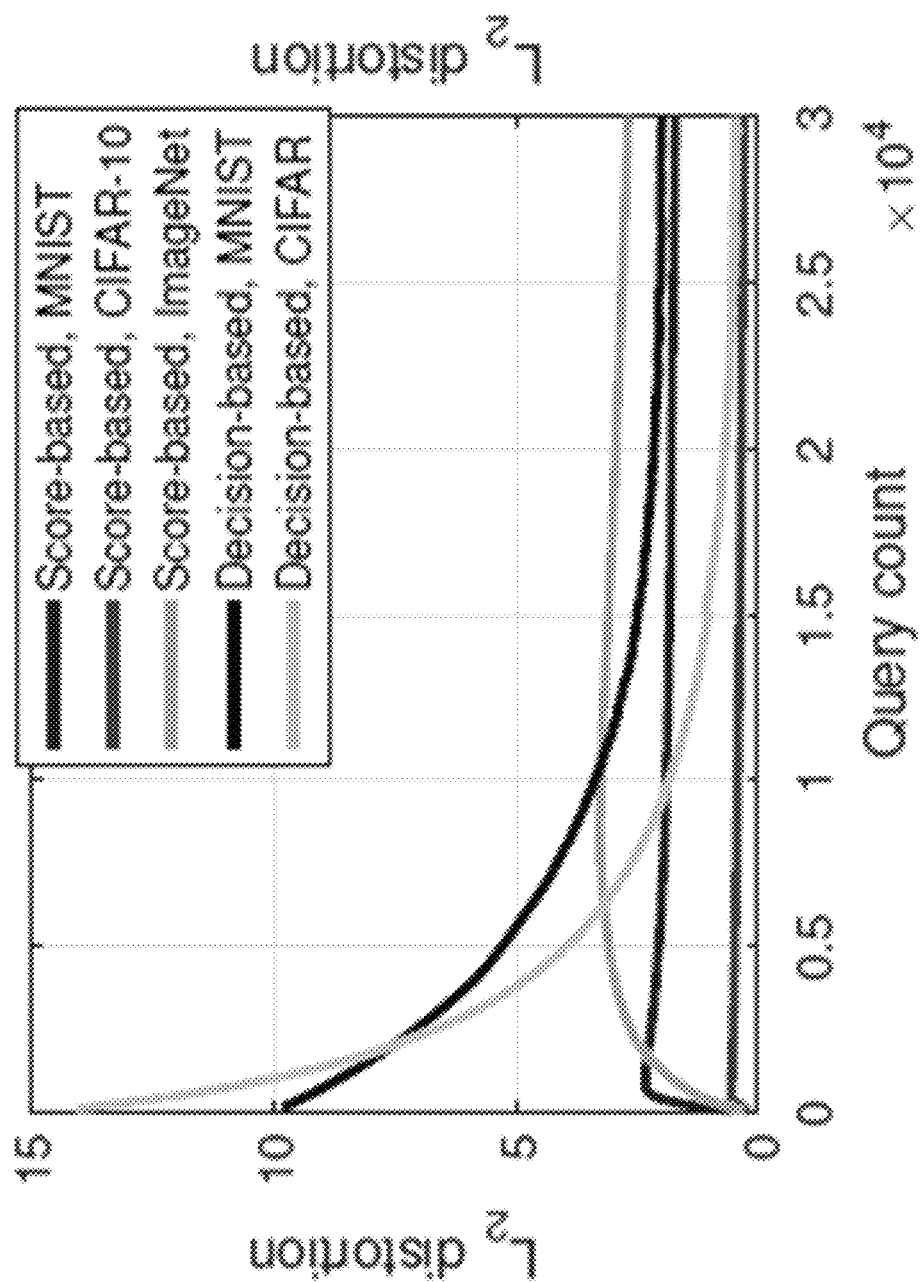
Figure 8:
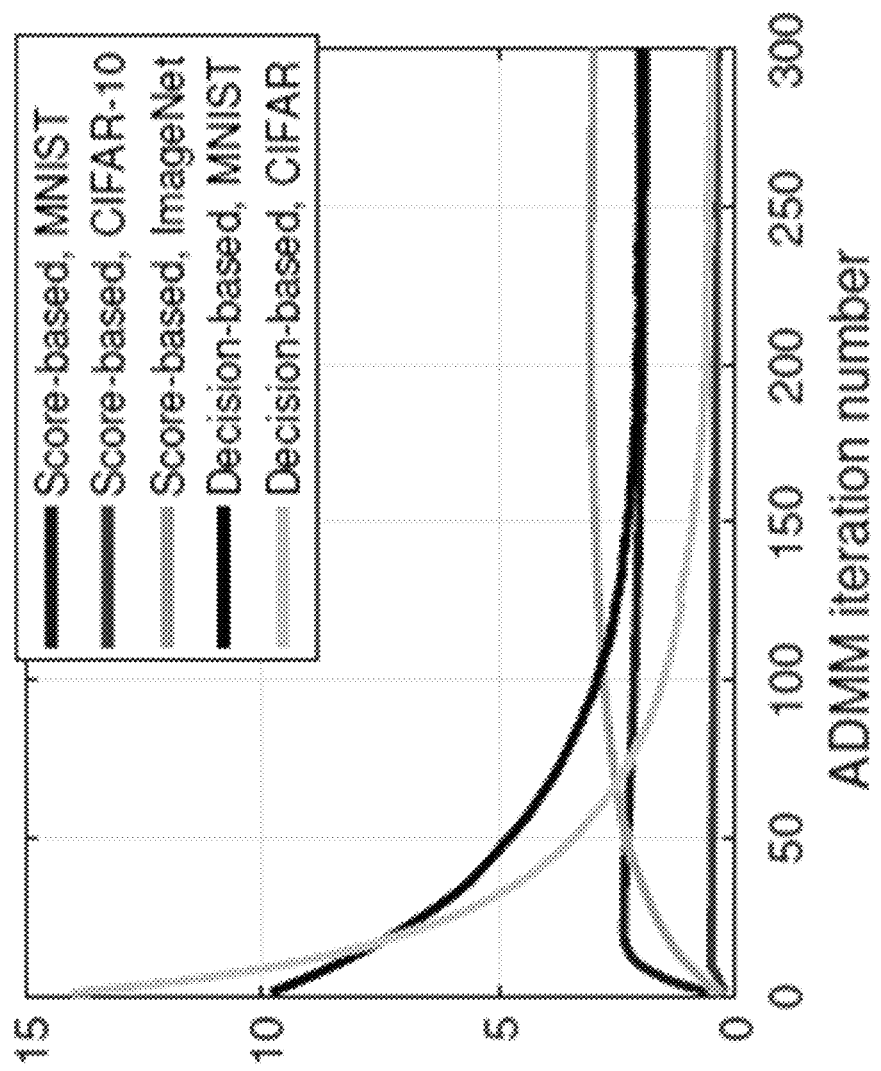

For convergence of the 'ZO-ADMM attack', the convergence of the 'ZO-ADMM-based attack' on three datasets is shown in FIGS. 7-8. The average $L_2$ distortion of 9 targeted adversarial examples versus the query number is presented in FIG. 7. In the score-based attack, the initial $L_2$ distortion is zero since the 'ZO-ADMM-based attack' starts from a zero perturbation. The experiments show that before a successful adversarial example is found, the $L_2$ distortion keeps increasing. After the 'ZO-ADMM-based attack' achieves its first success, the algorithm then tries to decrease the $L_2$ distortion while maintaining its target label. The experiments highlight that the 'ZO-ADMM attack' is able to achieve its initial success with hundreds of queries on MNIST or CIFAR-10 and tens of thousands of queries on ImageNet, which is a great improvement over the 'ZOO attack'. For the decision-based attack, the $L_2$ distortion is relatively large at first as the 'ZO-ADMM-based attack' starts from an image in the target class instead of the original image. As observed from FIG. 7, the $L_2$ distortion of the adversarial examples decreases as the query number increases. FIG. 8 demonstrates the $L_2$ distortion of adversarial examples versus the 'ZO-ADMM' iteration number. It is noted that in each 'ZO-ADMM' iteration, the decision-based attack usually needs more queries than the score-based attack due to the smoothed loss function.

The experiments also show that although the initial $L_2$ distortion is large due to the initial image in the target class, it can converge to a value close to the $L_2$ distortion of the score-based attack.

Also, the experimental results for different $L_p$ norms are demonstrated when solving equation (12). The experiments are run based on a developed three score-based black-box attacks with 'ZO-ADMM', minimizing the $L_0$, $L_1$ and $L_2$ norm of the perturbation, respectively. As shown in FIG. 10, the 'ZO-ADMM' technique provides a general framework to minimize different $L_p$ m norms by simply setting $D(z)$ to the corresponding $L_p$ m norm.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 11, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 12:
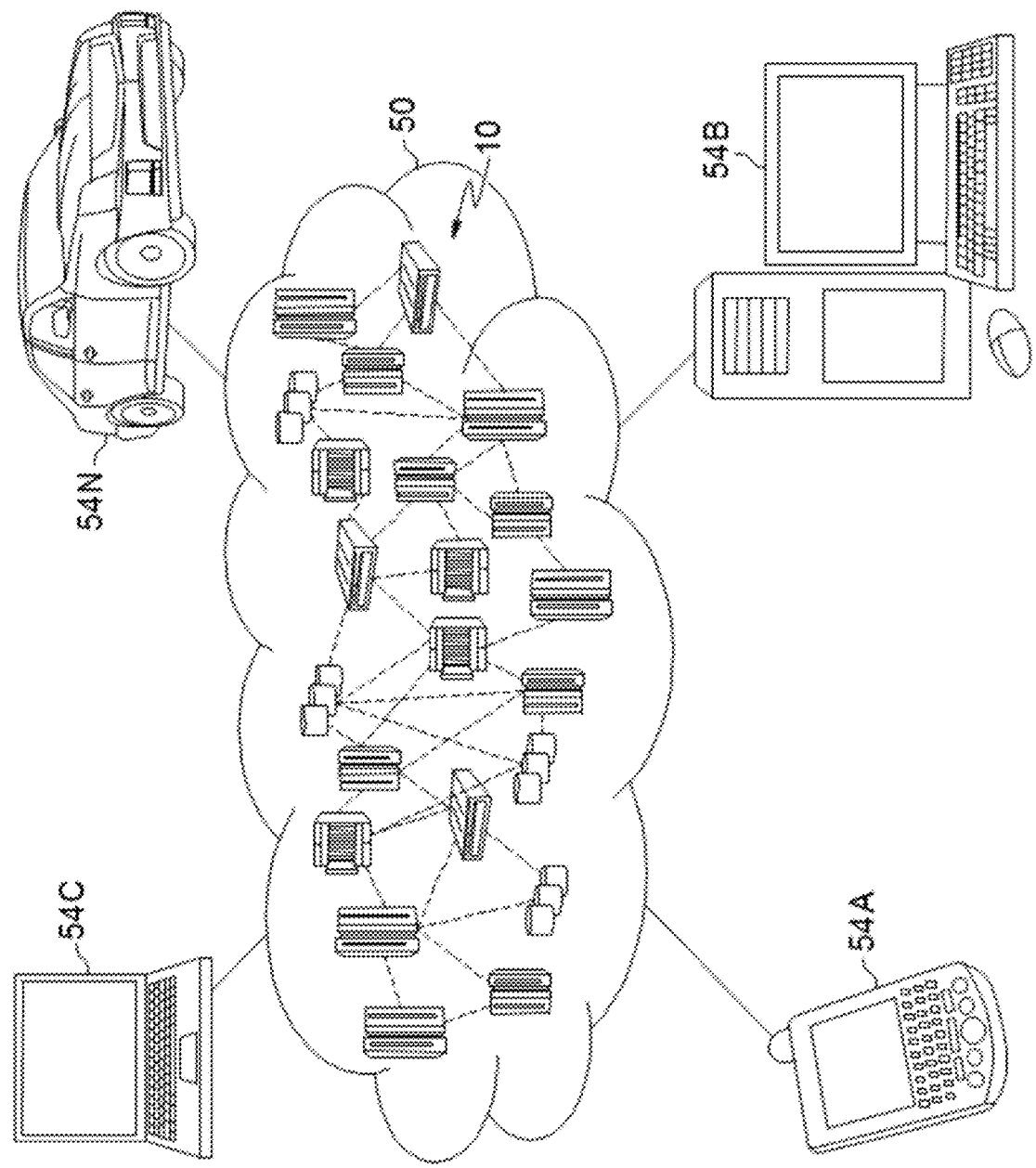
FIG. 12 depicts a cloud-computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Figure 13:
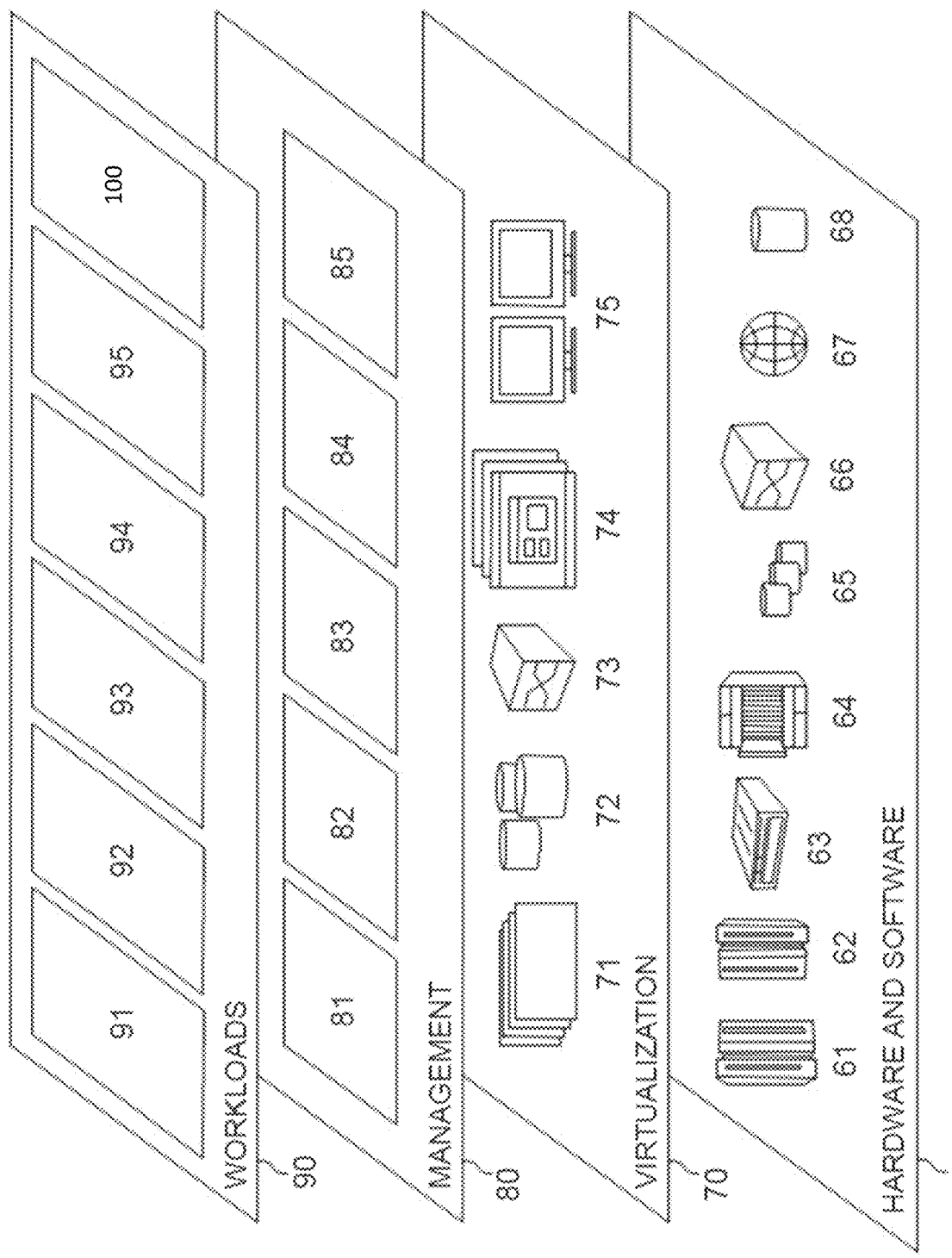
FIG. 13 depicts abstraction model layers according to an embodiment of the present invention.

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adversarial robustness testing method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented adversarial robustness testing method for checking a learning performance of a black-box system, the method comprising:
    testing a robustness, against an adversarial attack, of a black-box system under different access settings via an accelerator by generating adversarial inputs of a model in a limited access setting of the different access settings;
    given a legitimate input of a plurality of legitimate inputs having a correct class label, determining an optimal adversarial perturbation using the accelerator such that a perturbed example is misclassified to a target class including an incorrect class label by a deep neural network model trained on the legitimate inputs,
    wherein a perturbed noise at each pixel of the perturbed example is imperceptible up to a predefined ε-tolerant threshold and a non-negative regularization parameter places emphasis on a distortion between adversarial examples and a legitimate image.

2. The method of claim 1, wherein the different access settings comprise:
    a soft-label setting; and
    a hard-label setting.

3. The method of claim 2, further comprising:
    using the accelerator and a gradient descent technique, in the soft-label setting, to find the adversarial examples and summarize a first robustness statistic; and
    using the accelerator and a smoothing function, for the hard-label setting, to summarize a second robustness statistic.

4. The method of claim 1, wherein the accelerator comprises a function including an efficient gradient estimation via a random directional estimate and averaging.

5. The method of claim 1, wherein the accelerator comprises a function including a dimension reduction of an input.

6. The method of claim 1, wherein the accelerator comprises a function including a problem splitting between a black-box loss function and a white-box adversarial distortion function.

7. The method of claim 1, embodied in a cloud-computing environment.

8. A computer program product for adversarial robustness testing for checking a learning performance of a black-box system, the computer program product comprising a computer-readable storage medium having program instructions embodied therewith, the program instructions executable by a computer to cause the computer to perform:

testing a robustness, against an adversarial attack, of a black-box system under different access settings via an accelerator by generating adversarial inputs of a model in a limited access setting of the different access settings;

given a legitimate input of a plurality of legitimate inputs having a correct class label, determining an optimal adversarial perturbation using the accelerator such that a perturbed example is misclassified to a target class including an incorrect class label by a deep neural network model trained on the legitimate inputs, wherein a perturbed noise at each pixel of the perturbed example is imperceptible up to a predefined ε-tolerant threshold and a non-negative regularization parameter places emphasis on a distortion between adversarial examples and the legitimate image.

9. The computer program product of claim 8, wherein the different access settings comprise:
a soft-label setting; and
a hard-label setting.

10. The computer program product of claim 9, further comprising:
using the accelerator and a gradient descent technique, in the soft-label setting, to find the adversarial examples and summarize a first robustness statistic; and
using the accelerator and a smoothing function, for the hard-label setting, to summarize a second robustness statistic.

11. The computer program product of claim 8, wherein the accelerator comprises a function including an efficient gradient estimation via a random directional estimate and averaging.

12. The computer program product of claim 8, wherein the accelerator comprises a function including a dimension reduction of an input.

13. The computer program product of claim 8, wherein the accelerator comprises a function including a problem splitting between a black-box loss function and a white-box adversarial distortion function.

14. An adversarial robustness testing system for checking a learning performance of a black-box system, the system comprising:
a processor; and
a memory, the memory storing instructions to cause the processor to perform:
testing a robustness, against an adversarial attack, of a black-box system under different access settings via an accelerator by generating adversarial inputs of a model in a limited access setting of the different access settings;
given a legitimate input of a plurality of legitimate inputs having a correct class label, determining an optimal adversarial perturbation using the accelerator such that a perturbed example is misclassified to a target class including an incorrect class label by a deep neural network model trained on the legitimate inputs,
wherein a perturbed noise at each pixel of the perturbed example is imperceptible up to a predefined ε-tolerant threshold and a non-negative regularization parameter places emphasis on a distortion between adversarial examples and the legitimate image.

15. The system of claim 14, wherein the different access settings comprise:
a soft-label setting; and
a hard-label setting.

16. The system of claim 15, further comprising:
using the accelerator and a gradient descent technique, in the soft-label setting, to find the adversarial examples and summarize a first robustness statistic; and
using the accelerator and a smoothing function, for the hard-label setting, to summarize a second robustness statistic.

17. The system of claim 14, wherein the accelerator comprises a function including an efficient gradient estimation via a random directional estimate and averaging.

18. The system of claim 14, wherein the accelerator comprises a function including a dimension reduction of an input.

19. The system of claim 14, wherein the accelerator comprises a function including a problem splitting between a black-box loss function and a white-box adversarial distortion function.

20. A computer-implemented adversarial robustness testing method for checking a learning performance of a black-box system, the method comprising:
testing a robustness, against an adversarial attack, of the black-box system under a limited access setting to the black-box system:
receiving a first classification of an input as an output from the black-box system; and
determining a minimal change to the input such that a second classification is received as the output from the black-box system;
given a legitimate input of a plurality of legitimate inputs having a correct class label, determining an optimal adversarial perturbation using an accelerator such that a perturbed example is misclassified to a target class including an incorrect class label by a deep neural network model trained on the legitimate inputs,
wherein a perturbed noise at each pixel of the perturbed example is imperceptible up to a predefined ε-tolerant threshold and a non-negative regularization parameter places emphasis on a distortion between adversarial examples and the legitimate image.

21. A computer-implemented adversarial robustness testing method for checking a learning performance of a black-box system, the method comprising:
testing a robustness, against an adversarial attack, of the black-box system under a limited access setting to the black-box system:
finding a minimal change to an input such that a classification of an output from the black-box system is different than an original classification of the input, wherein the testing includes a function to reduce an attack space in the adversarial attack for query efficiency;
given a legitimate input of a plurality of legitimate inputs having a correct class label, determining an optimal adversarial perturbation using an accelerator such that a perturbed example is misclassified to a target class including an incorrect class label by a deep neural network model trained on the legitimate inputs, wherein a perturbed noise at each pixel of the perturbed example is imperceptible up to a predefined ε-tolerant threshold and a non-negative regularization parameter places emphasis on a distortion between adversarial examples and the legitimate image.

* * * * *